Feb. 18, 1930.  C. T. OLSON ET AL  1,747,385

LATHE CENTER

Filed April 9, 1926

WITNESS
SHERMAN OPDAHL

INVENTORS
EDWARD P. SCHMIDT
CLARENCE T. OLSON
By Victor J. Evans
ATTORNEY

Patented Feb. 18, 1930

1,747,385

UNITED STATES PATENT OFFICE

CLARENCE T. OLSON, OF CHICAGO, AND EDWARD P. SCHMIDT, OF HOLLYWOOD, ILLINOIS

LATHE CENTER

Application filed April 9, 1926. Serial No. 100,974.

This invention relates to lathe centers and more particularly to means providing exceptional thrust or axial load capacity without imposing this load on the anti-friction bearings incorporated, leaving these to properly carry only the radial load.

A further object is the provision of automatic adjustment and take-up on both pivot and radial bearings so that the spindle will rotate accurately and without chatter at all times.

The invention is fully described in the following specification and shown in the accompanying drawings, in which.

Figure 1:
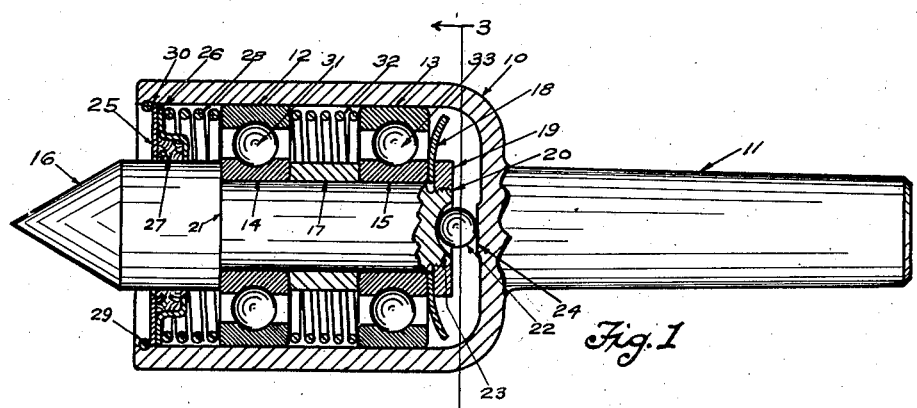
Fig. 1 is a horizontal section thru the lathe center, showing the construction of same.

Referring to the above mentioned drawings, a hollow body 10 is shown with a tapered spindle 11 which is the usual construction of lathe centers in that it serves as a means for mounting the lathe center in the tailstock of the lathe or other similar machine. The outer raceway rings 12 and 13 of the anti-friction bearings are slidably mounted in the hollow body 10. The inner raceway rings 14 and 15 are mounted on the work receiving spindle 16 and are spaced thereon by means of a sleeve 17. A spring washer 18, acting as a lock washer and as an oil slinger, is incorporated between inner raceway ring 15 and nut 19 which engages threaded end 20 of spindle 16 and forces ring 15 against sleeve 17 which in turn forces inner ring 14 against a shoulder 21 formed integral with said spindle, thereby locking all against relative movement on the shaft.

A ball 22 is mounted in a depression or socket 23 in one end of spindle 16 and is interposed between end of said spindle and inner wall 24 of housing 10. This ball serves as a pivot bearing and carries the thrust or axial load imposed on the work receiving spindle 16 when supporting the work. In order to protect the anti-friction bearings from dirt and other foreign matter and at the same time provide a container for the lubricant, two plates 25 and 26 are so formed to carry a ring of felt 27. These enclosure plates carrying the felt ring are mounted in the open end of housing 10 and held in position by means of a coil spring 28 which is inserted between outer race ring 12 and enclosure plates 25 and 26 forcing said plates against a spring wire 29 inserted in a groove 30 in said housing 10. Spring 28 not only holds the enclosure plates 25 and 26 and felt ring 27 in position against spring wire 29 but also forces outer race ring 12 in the opposite direction thereby taking up radial clearance between anti-friction rolling members 31 and inner and outer race rings 14 and 12 respectively. This coil spring has still another function in that it forces the spindle 16 thru the anti-friction bearing comprising parts 12, 31 and 14 in one direction up against the ball 22, keeping the same in proper contact and adjustment between said spindle and the housing wall 24 of the housing 10. A second coil spring 32 of different compression strength, is interposed between outer race rings 12 and 13 thereby forcing outer race ring 13 in one direction so as to take up radial clearance existing between anti-friction rolling members 33 and inner and outer race rings 15 and 13 respectively.

Figure 2:
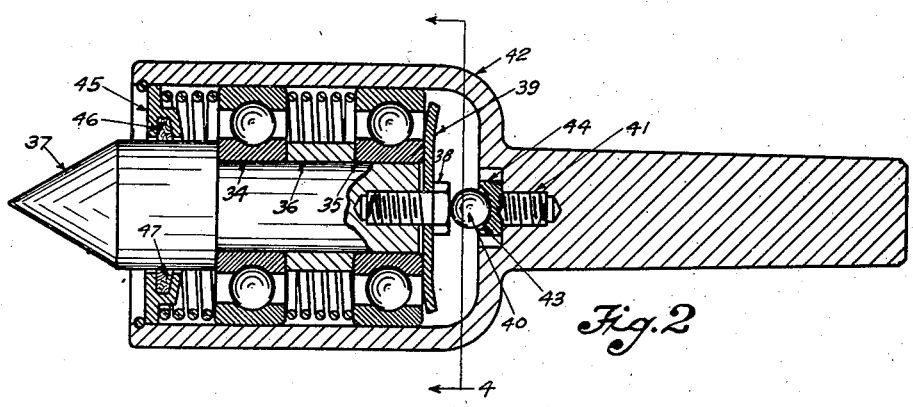
Fig. 2 is a similar view of a modified form of the invention.
Figure 3:
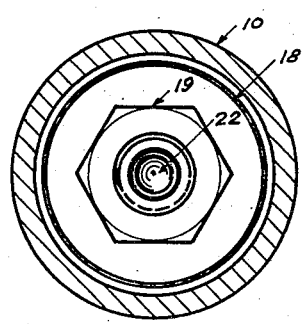
Fig. 3 and Fig. 4 are transverse sections on the lines 3 and 4 respectively of Fig. 1 and Fig. 2.
Figure 4:
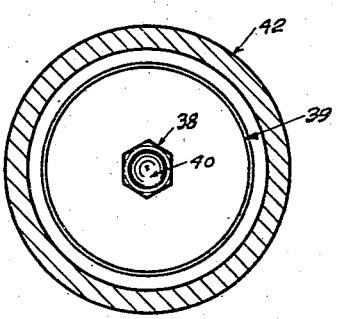

In Fig. 2 and Fig. 4 is shown a modified form of the device in which the inner raceway members 34 and 35 and also the spacing member 36 are locked in one unit against relative movement on spindle 37 by means of cap screw 38 and combination lock washer and oil slinger 39. A ball 40 is interposed between the head of cap screw 38 and another cap screw 41 which is mounted in the center of the inner wall of housing 42 and which has a depression or socket 43 in the head 44 so as to receive the said ball. The remaining construction of the design is the same as in Fig. 1 and Fig. 3 with the exception of the enclosure plate 45 which is shown made of one piece and having a groove 46 adapted to carry a ring of felt 47 so as to form a seal to retain the lubricant in the housing 42 and exclude dirt and other foreign matter from the bearings.

From the foregoing, it will be noted that we have provided a revolving lathe center to replace the ordinary dead center and which will rotate accurately at all times due to the automatic adjustment of all bearings as well as suitable means for taking care of extreme thrust or axial loads that this type of a device may be subjected to in service.

While we have shown and described but a single embodiment of this invention, it is to be understood that it is capable of many modifications. Changes in the construction and arrangement may, therefore, be made without departing from the spirit and scope of the invention as disclosed in the appended claims.

We claim:

1. A lathe center of the class described comprising a hollow body, anti-friction bearing outer race rings slidably mounted therein, a work receiving spindle carrying anti-friction bearing inner race rings tightly mounted and spaced thereon, a plurality of rolling members interposed between said anti-friction bearing inner and outer race rings for rotatably mounting the work receiving spindle in the hollow body, a ball interposed between one end of said spindle and said hollow body for limiting end motion of said spindle in one direction with relation to said hollow body, springs acting against said anti-friction bearing race rings to provide automatic take-up of clearances between said anti-friction bearing rolling members and inner and outer race rings so as to limit radial motion of said spindle with relation to said hollow body.

2. A lathe center of the class described comprising a hollow body, anti-friction bearing outer race rings slidably mounted therein, a work receiving spindle carrying anti-friction bearing inner race rings tightly mounted and spaced thereon, a plurality of rolling members interposed between said anti-friction bearing inner and outer race rings for rotatably mounting the work receiving spindle in the hollow body, a ball interposed between one end of said spindle and said hollow body for limiting end motion of said spindle in one direction with relation to said hollow body, means provided for limiting end motion of said spindle in opposite direction, said means providing automatic take-up of clearances between said anti-friction bearing rolling members and inner and outer race rings so as to limit radial motion of said spindle with relation to said hollow body.

3. A lathe center of the class described, comprising a hollow body, anti-friction bearing outer race rings slidably mounted therein, a work receiving spindle carrying anti-friction bearing inner race rings tightly mounted and spaced thereon, a plurality of rolling members interposed between said anti-friction bearing inner and outer race rings for rotatably mounting the work receiving spindle in the hollow body, a ball interposed between one end of said spindle and said hollow body for limiting end motion of said spindle in one direction with relation to said hollow body, springs acting against anti-friction bearing outer race rings to limit end motion of said spindle in opposite direction and provide automatic take-up of clearances between anti-friction bearing rolling members and inner and outer race rings so as to limit radial motion of said spindle with relation to said hollow body and a disc interposed between one of the anti friction bearing inner race rings and a nut engaging threaded end of said spindle for locking said nut in position on said spindle and providing an oil slinger for lubricating aforementioned ball.

4. A lathe center of the class described comprising a hollow body, two anti-friction bearing outer race rings slidably mounted therein, a work receiving spindle carrying two anti-friction bearing inner race rings tightly mounted and spaced thereon, a plurality of rolling members interposed between said anti-friction bearing inner and outer race rings for rotatably mounting the work receiving spindle in the hollow body, a ball interposed between one end of said spindle and said hollow body for limiting end motion of said spindle in one direction, a spring acting against one of the anti-friction bearing outer race rings for limiting end motion of said spindle in opposite direction and providing automatic take-up of clearances between rolling members and inner and outer race rings of one of said anti-friction bearings, a second spring of different compression strength interposed between anti-friction bearing outer race rings so as to provide automatic take-up of clearances between rolling members and inner and outer race rings of other anti-friction bearing.

5. A lathe center including a work receiving spindle, anti-friction bearing means, means for securing said bearing means on said spindle, a housing having a recess therein adapted to receive said spindle and said bearing means, a member disposed around said spindle juxtaposed to the open end of said recess, means for securing said member to said housing, a ball disposed between the inner wall of said recess and the end of said spindle, and spring means disposed around said spindle between said member and said bearing means adapted to urge said bearing means toward said wall.

6. A lathe center including a work receiving spindle having a shank portion defining a shoulder thereon, ball bearings, the inner races of said ball bearings being tightly fitted on said shank portion, means for locking said inner races in position, a housing having a recess therein adapted to receive said spindle and said bearings, the outer races of said bearings being slidable along the walls of said recess, a ball disposed between the inner end of said spindle and the wall of said recess, a member disposed around said spindle juxtaposed to the open end of said recess, spring means disposed between said means and said outer races acting to prevent radial movement of the component parts of said bearing means.

7. A lathe center including a work receiving spindle having a shank portion defining a shoulder thereon, ball bearings, the inner races of said ball bearings being disposed on said shank portion, means for spacing said races on the said shank portions, means for locking said races in position, a housing having a recess therein adapted to receive said spindle and said bearings, the outer race of said ball bearings being slidable along the walls of said recess, a member disposed around said spindle juxtaposed to the open end of said recess, means for securing said member in position, spring means disposed around said spindle between said member and the outer races of said bearings, and adapted to urge said races against the balls retained therein, and a thrust receiving ball disposed between the inner end of the said spindle and the wall of the said recess.

8. A device of the class described including a work receiving spindle, anti-friction bearing means, means for securing said bearing means on said spindle, a housing having a recess therein adapted to receive said spindle and said bearing means, a plate having an opening therein and adapted to be positioned near the open end of said recess, said spindle protruding through the opening therein, another plate juxtaposed to said first plate and disposed interiorly thereof in said recess and having an inwardly disposed portion defining a space between said plates around said spindle, a packing of fibrous material in said space in engagement with said spindle, spring means disposed between said second mentioned plate and said bearing means, and a locking member disposed exteriorly said first mentioned plate adapted to lock said plate to said housing and to limit the action of said spring means.

9. A device of the class described including a work receiving spindle, anti-friction bearing means, means for securing said bearing means on said spindle, a housing having a recess therein adapted to receive said spindle and said bearing means, means disposed around said spindle near the open end of said recess having a space therein opening toward said spindle, a packing of fibrous material in said space, said housing having a groove formed therein near the open end of said recess, spring means disposed between said space defining means and said bearing means, and a locking member disposed in said groove, said space defining means being disposed between said spring means and said locking means.

10. A lathe center comprising a housing, a work receiving spindle, ball bearings mounted on said spindle in spaced apart relation, the outer races of said ball bearings being slidable in said housing, a spring interposed between the outer races of said ball bearings, another spring mounted between the outer race of the forwardly disposed of said ball bearings and a retaining plate mounted at the end of said housing from which said spindle protrudes, said spring acting on said outer race to vary the angle of contact in said ball bearings to eliminate radial play, and means in said housing for receiving the thrust of said spindle.

11. A lathe center comprising a housing, a work receiving spindle, ball bearings, means for fixing the inner races of said ball bearings on said spindle in spaced apart relation, a spring interposed between the outer races of said ball bearings, said housing having an open end, a plate for closing said open end having an opening therein through which said spindle may be extended, a spring interposed between said plate and the outer race of the juxtaposed of said ball bearings, and means in said housing for receiving the thrust of said spindle.

CLARENCE T. OLSON.
EDWARD P. SCHMIDT.